United States Patent
Ahn et al.

(10) Patent No.: US 9,932,472 B2
(45) Date of Patent: Apr. 3, 2018

(54) PRODUCTION METHOD FOR RUBBER-REINFORCED THERMOPLASTIC RESIN

(71) Applicant: LG CHEM, LTD., Seoul (KR)

(72) Inventors: Bong Keun Ahn, Daejeon (KR); Keun Hoon Yoo, Daejeon (KR); Dae Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/893,898

(22) PCT Filed: Jul. 22, 2014

(86) PCT No.: PCT/KR2014/006623
§ 371 (c)(1),
(2) Date: Nov. 24, 2015

(87) PCT Pub. No.: WO2015/016520
PCT Pub. Date: Feb. 5, 2015

(65) Prior Publication Data
US 2016/0137830 A1   May 19, 2016

(30) Foreign Application Priority Data

Aug. 2, 2013  (KR) .......................... 10-2013-0091928
Jul. 17, 2014  (KR) .......................... 10-2014-0090208

(51) Int. Cl.
*C08L 51/04* (2006.01)
*C08F 279/04* (2006.01)
*C08F 236/06* (2006.01)

(52) U.S. Cl.
CPC ............ *C08L 51/04* (2013.01); *C08F 236/06* (2013.01); *C08F 279/04* (2013.01); *C08L 2201/08* (2013.01); *C08L 2201/10* (2013.01)

(58) Field of Classification Search
CPC ...... C08L 51/04; C08F 279/04; C08F 212/10; C08F 220/44; C08J 2351/04; C08J 2433/20; C08J 2333/20; C08J 2451/04; C08J 2455/02
See application file for complete search history.

(56) References Cited

U.S. PATENT DOCUMENTS

| 2005/0238990 A1* | 10/2005 | Kambara ............... G03F 7/0397 430/270.1 |
| 2009/0123868 A1* | 5/2009 | Yamagishi .............. G03F 7/085 430/270.1 |
| 2014/0094556 A1* | 4/2014 | Ahn ....................... C08F 279/04 524/504 |
| 2016/0083572 A1* | 3/2016 | Niessner ............... C08F 265/04 525/70 |

FOREIGN PATENT DOCUMENTS

| CN | 102311527 A | 11/2012 |
| KR | 10-2002-0039854 A | 5/2002 |
| KR | 10-20030020998 A | 3/2003 |
| KR | 10-2008-0057539 A | 6/2008 |
| KR | 10-2013-0054907 A | 5/2013 |
| KR | 10-2013-0082429 A | 7/2013 |
| WO | WO 2013/105737 A1 | 7/2013 |

OTHER PUBLICATIONS

Ahn et al., DERWENT-ACC-No. 2013-L87352 (2013).*
International Search Report for PCT/KR2014/006623 filed on Jul. 22, 2014.
Office Action for Chinese Patent Application No. 201480013401.9 dated Sep. 23, 2016.

* cited by examiner

*Primary Examiner* — Jeffrey C Mullis

(57) ABSTRACT

Disclosed is a method of preparing a rubber-reinforced thermoplastic resin. According to the present invention, a graft copolymer comprising a large-particle-size rubber polymer obtained by welding polymerization-heat-control-type small particles and a reactive emulsifier or a mixed emulsifier comprising a reactive emulsifier and a non-reactive emulsifier is prepared, and a rubber-reinforced thermoplastic resin comprising the same may have enhanced mechanical properties, thermal stability, surface visibility and gloss.

15 Claims, No Drawings

PRODUCTION METHOD FOR RUBBER-REINFORCED THERMOPLASTIC RESIN

CROSS-REFERENCE TO RELATED APPLICATIONS

The present application is a National Stage of International Patent Application No. PCT/KR2014/006623 filed on Jul. 22, 2014, which claims priority to Korean Patent Application No. KR 10-2013-0091928 filed on Aug. 2, 2013, and No. 10-2014-0090208 filed on, Jul. 17, 2014.

TECHNICAL FIELD

The present invention relates to a method of preparing a rubber-reinforced thermoplastic resin. More particularly, the present invention relates to a method of preparing a graft copolymer comprising a large-particle-size rubber polymer obtained by welding polymerization-heat-control-type small particles and only a reactive emulsifier or a mixed emulsifier comprising a reactive emulsifier and a non-reactive emulsifier, and a method of preparing a rubber-reinforced thermoplastic resin having enhanced mechanical properties, thermal stability, surface visibility and gloss by comprising the same.

BACKGROUND ART

Examples of general rubber-reinforced thermoplastic resin comprise ABS, ASA, MBS, and AIM resins. These resins are similar in that a rubber polymer of 0° C. or less is used as a core and a shell selected considering compatibility with a matrix resin is formed through graft polymerization.

For example, in order to secure impact resistance upon preparation of an ABS resin, a large-particle-size rubber polymer having a particle size of 3000 Å is used. In this case, the large-particle-size rubber polymer may be prepared by enlarging a small-particle-size rubber polymer having a particle size of 2000 Å or less, or by directly emulsion-polymerizing a large-particle-size rubber polymer having a particle size of 3000 Å or more. In this case, a rubber latex having a large particle size of 3000 Å or more obtained though the direct emulsion polymerization has narrow particle size distribution and low gel content, and thus having advantageous impact resistance. However, the rubber latex requires a polymerization time of 20 hours or more, and reaction time increases and transition ratio decreases with increasing particle size.

While, a small-particle-size rubber polymer having a particle size of 2000 Å or less has advantageous productivity in that the small-particle-size rubber polymer may be generally prepared within a short time of 15 to 20 hours. When a large-particle-size rubber latex having a particle size of 3000 Å or more is prepared by enlarging the small-particle-size rubber polymer, it is relatively easy control to particle sizes and broad particle size distribution is exhibited. When small-sized particles are present in broad particle size distribution, surface gloss and visibility of a resin are advantageously enhanced. Conventionally, a small-particle-size rubber polymer latex is prepared by simultaneously or separately inputting a butadiene monomer and within a relatively short time of 15 to 20 hours. However, heat from rapid heat reaction generated in this case is cooled with an ammonia refrigerant or low-temperature water using a coil-type cooler in the outside or inside of a reactor. As such, rapid heat reaction occurring after simultaneously and separately inputting of butadiene monomer causes non-uniformity of latex particles and a solid content, whereby continuous long-term operation is hindered and it is difficult to additionally reduce reaction time due to ineffective reaction heat distribution.

In addition, ABS based rubber-reinforced resins are conventionally prepared as a rubber-reinforced resin through emulsion polymerization, and, after preparing into a powder by coagulating/drying the rubber-reinforced resin, the powder-type rubber-reinforced resin is conventionally pelletized a first process step by inputting the same with a matrix resin such as styrene-acrylonitrile and/or polycarbonate to an extruder. In this case, a drying process is generally carried out such that a rubber-reinforced resin having a moisture content of less than 1% is input to an extruder.

In some cases, a first processing step, in which, after dehydrating without drying, a powder having a moisture content of approximately 30% is continuously kneaded with the matrix resin in an extruder, is carried out. However, a high moisture content leads to property deviation and productivity reduction.

Therefore, when a powder comprising moisture is input to an extruder without a dying process, minimizing a moisture content may be an important factor in maintaining productivity and quality.

In addition, since a centrifugal dehydrator conventionally used to reduce moisture content has limitations, a compression-type dehydrator may be used. However, a high-temperature and high-pressure processing process required in a compression-type dehydration process may lead to change of thermal stability and resin deformation.

DISCLOSURE

Technical Problem

Therefore, the present invention has been made in view of the above problems, and it is one object of the present invention to provide a method of preparing a graft copolymer comprising a large-particle-size rubber polymer obtained by welding polymerization-heat-control-type small particles and only a reactive emulsifier or a mixed emulsifier comprising a reactive emulsifier and a non-reactive emulsifier, and a method of preparing a rubber-reinforced thermoplastic resin having enhanced mechanical properties, thermal stability, surface visibility and gloss by comprising the same.

Technical Solution

In accordance with one aspect of the present invention, provided is a method of preparing a rubber-reinforced thermoplastic resin, the method comprising preparing into a large particle size after preparing a small-particle-size rubber polymer having a maximum polymerization-heat deviation ($\Delta T_{Max}$) of 4 or less at a polymerization temperature of 50 to 80;

dehydrating to a moisture content of 5 to 15% after preparing an acrylonitrile-styrene-butadiene-based graft copolymer from the rubber polymer prepared into the large particle size; and mixing the dehydrated graft copolymer and a matrix resin.

In accordance with another aspect of the present invention, provided is a rubber-reinforced thermoplastic resin that is obtained by the method described above and comprises a remaining emulsifier of 3590 ppm or less.

Advantageous Effects

As apparent from the fore-going, a rubber-reinforced thermoplastic resin obtained from a graft copolymer having reinforced rubber and quarantined latex stability, and a matrix resin may exhibit mechanical properties, thermal stability, surface visibility and gloss, and may have enhanced polymerization stability and productivity.

BEST MODE

Hereinafter, the present invention is described in detail.

When a small-particle-size rubber polymer according to the present invention is prepared, polymerization transition ratio is maintained while decreasing polymerization time through effective control of polymerization heat.

In particular, a method of preparing a rubber-reinforced thermoplastic resin according to the present invention may be carried according to processes below:

preparing into a large particle size after preparing a small-particle-size rubber polymer having a maximum polymerization-heat deviation ($\Delta T_{Max}$) of 4 or less;

dehydrating to a moisture content of 5 to 15% after preparing an acrylonitrile-styrene-butadiene-based graft copolymer from the rubber polymer prepared into the large particle size; and mixing the dehydrated graft copolymer and a matrix resin The expression "rubber-reinforced thermoplastic resin composition" means, so long as specified otherwise, a thermoplastic resin composition comprising a rubber latex (corresponding to a large-particle-size rubber polymer) in an amount of 50% by weight or more or 50 to 70% by weight based on the composition. The rubber latex may be prepared using one conjugated diene monomer type or more selected from the group consisting of 1,3-butadiene, 2,3-dimethyl-1,3-butadiene, piperylene, 3-butyl-1,3-octadiene, isoprene and 2-phenyl-1,3-butadiene.

In addition, the expression "maximum polymerization-heat deviation ($\Delta T_{Max}$)" means a parameter suggested considering a problem wherein heating control is not easy with increasing $\Delta T$ difference at polymerization temperature and thus polymerization stability is decreased, and, when a refrigerant is added in a large amount in order to remove the heating, activity of a peroxide initiator is decreased, and thus, polymerization time is extended or a polymerization transition ratio is decreased.

In an embodiment, the maximum polymerization-heat deviation ($\Delta T_{Max}$) may be 1 to 4, 2.5 or less, or 1 to 2.5 based on polymerization temperature, within these ranges, a polymerization transition ratio may be maintained while reducing polymerization time by effectively controlling polymerization heat when a small-particle-size rubber polymer is prepared. In an embodiment, the polymerization temperature may be 50 to 80° C. or 53 to 80° C.

In a specific embodiment, the maximum polymerization-heat deviation ($\Delta T_{Max}$) may be 1 to 4 or less, 2.5 or less, or 1 to 2.5 based on a later polymerization temperature of 80 elevated from an initial polymerization temperature of 53.

In an embodiment, the small-particle-size rubber polymer may be prepared by emulsion-polymerizing at a polymerization temperature of 50 to 80 for 5 to 13 hours. For reference, the total time corresponds to a time taken until a polymerization completion time point from a simultaneous addition time point of a first composition.

In a specific embodiment, a preparation process of the small-particle-size rubber polymer may comprise inputting batchwise a first composition containing 5 to 80 parts by weight, 10 to 75 parts by weight, 15 to 75 parts by weight or 20 to 65 parts by weight by weight of a conjugated diene monomer and initiating reaction at 50 to 70; and performing emulsion polymerization at 70 to 80 while continuously inputting a second composition containing 95 to 20 parts by weight, 90 to 25 parts by weight, 85 to 25 parts by weight or 80 to 35 parts by weight of a conjugated diene monomer for 4 to 10 hours at a time point of 0 to 8 hours from the reaction initiation point.

In an embodiment, the first composition may comprise 1 to 4 parts by weight or 1 to 3 parts by weight of one emulsifier or more selected from a reactive emulsifier and a non-reactive emulsifier, 0.1 to 3 parts by weight or 0.1 to 1 part by weight of a polymerization initiator, 0.1 to 1 part by weight or 0.1 to 0.5 parts by weight of a molecular weight controller, 0.1 to 3 parts by weight or 0.1 to 1 part by weight of an electrolyte and 100 to 150 parts by weight or 110 to 140 parts by weight of ion deionized water, based on 100 parts by weight of the total conjugated diene monomer.

In an embodiment, the electrolyte may be one or more selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, K$_3$PO$_4$, Na$_3$PO$_4$ and Na$_2$HPO$_4$.

In an embodiment, the second composition may comprise 0.01 to 1 parts by weight or 0.05 to 0.5 parts by weight of a molecular weight controller based on 100 parts by weight of the total conjugated diene monomer.

In another embodiment, the first composition is input batchwise and then the second composition is continuously added thereto. Accordingly, a small-particle-size rubber polymer in which a polymerization-heat deviation is controlled may be provided.

In another embodiment, at a time point of 0 to 8 hours, 0 to 4 hours, or 0 to 3 hours after simultaneous input of the first composition, the second composition may be continuously added thereto over a period of 4 to 10 hours or 6 to 10 hours.

In an embodiment, according to the preparation process of the small-particle-size rubber polymer, small-a particle-sized rubber polymer having an average particle size of 500 to 2000 Å, 1000 to 1500 Å or 1000 to 1300 Å, a gel content of 90 to 99 wt %, 92 to 97 wt % or 92.5 to 96 wt %, and a glass transition temperature (Tg) of 0° C. or less may be prepared.

A transition ratio of the polymerization may be 97.5% or more.

In an embodiment, in the preparing into the large particle size, a rubber polymer having an average particle size of 2500 to 4000 Å, 3000 to 3500 Å or 3100 to 3300 Å may be obtained by welding the small-particle-size rubber polymer with 0.1 to 5 parts by weight, 1 to 3 parts by weight or 1 to 2 parts by weight of one or more acidic ingredients selected from acetic acid and phosphoric acid based on 100 parts by weight of the small-particle-size rubber polymer.

The welding may be carried out according to conventional conditions. In an embodiment, after slowly adding 1 to 2 parts by weight of a 5% aqueous acetic acid solution over 20 to 60 minutes and stirring for 20 to 60 minutes, under conditions such as a stirring rate of 30 to 100 rpm and temperature of 15 to 50, stabilization may be carried out using a stabilizing solution such as a 10% aqueous KOH solution, and additional stirring may be carried out for 10 minutes.

In an embodiment, the acrylonitrile-styrene-butadiene-based graft copolymer may be prepared by polymerizing at 45 to 80 for three to six hours while continuously inputting the same to 0.001 to 0.5 parts by weight of a reactive emulsifier, or a mixed emulsifier comprising 0.001 to 0.3 parts by weight of a reactive emulsifier and 0.1 to 0.7 parts by weight of the non-reactive emulsifier; 0.1 to 0.5 parts by weight of a molecular weight controller; and 0.1 to 0.5 parts by weight of a polymerization initiator to 100 parts by weight of a mixture comprising 50 to 70 wt % of the rubber polymer prepared into a large particle size; and 50 to 30 wt % of a mixture comprising a styrene based monomer and an acrylonitrile based monomer, in an emulsion state. A transition ratio of the polymerization may be 97.5% or more.

The amount of the rubber polymer prepared into a large particle size comprised in the acrylonitrile-styrene-butadiene-based graft copolymer may be 50 to 70 wt %, 55 to 65 wt % or 60 wt %. When the amount is less than the lowest amount, gloss and heat-welding characteristics may be decreased. When the amount is greater than the highest amount, impact resistance, processability and thermal stability may be poor.

In an embodiment, the styrene based monomer may be styrene, α-methylstyrene, p-methylstyrene, vinyl toluene, t-butyl styrene, chlorostyrene, a substituent thereof, or the like, or may be a mixture of two types or more thereof.

In an embodiment, the acrylonitrile based monomer may be acrylonitrile, methacrylonitrile, a substituent thereof, or the like, or may be a mixture of two types or more thereof.

Other than the styrene based monomer and the acrylonitrile based monomer, other comonomers may be further added. In an embodiment, a vinyl based monomer such as maleimide, N-methylmaleimide, N-ethylmaleimide, N-propylmaleimide, N-phenylmaleimide, methyl methacrylate, methyl acrylate, butyl acrylate, acrylic acid, maleic anhydride or a mixture thereof may be used in a small amount.

In an embodiment, the amount of a mixture of the styrene based monomer and acrylonitrile based monomer may be 50 to 30 wt % or 45 to 35 wt %. In a specific embodiment, the mixture may comprise 40 to 20 wt % or 35 to 25 wt % of a styrene based monomer and 10 to 30 wt % or 15 to 25 wt % of acrylonitrile based monomer.

In an embodiment, the reactive emulsifier used in the present invention may be one or more selected from sulfoethyl methacrylate (sulfoethyl methacrylate), 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid di-potassium salt and sodium methallyl sulfonate.

The reactive emulsifier minimizes the content of an emulsifier remaining in a rubber-reinforced resin and thus may enhance thermal stability and surface gloss without addition of a thermal stabilizer.

In an embodiment, the non-reactive emulsifier used with the reactive emulsifier in the present invention may be one or more selected from alkylaryl sulfonate, alkalimethyl alkyl sulfate, sulfonated alkyl ester, fatty-acid soap and rosin-acid alkali salt.

In an embodiment, the reactive emulsifier is used alone, the reactive emulsifier may be used in an amount of 0.5 parts by weight or less or 0.001 to 0.5 parts by weight per process.

In addition, when the reactive emulsifier is mixed with the non-reactive emulsifier, 0.001 to 0.3 parts by weight of the reactive emulsifier and 0.1 to 0.7 parts by weight of the non-reactive emulsifier may be mixed and used.

In a specific embodiment, a coagulated solid content of the graft copolymer may be 0.001 to 0.07 wt %.

In an embodiment, the dehydrating may be carried out without a drying process after coagulating the graft copolymer with one coagulant or more selected from $MgSO_4$, $CaCl_2$, $Al_2(SO_4)_3$, sulfuric acid, phosphoric acid and hydrochloric acid.

In an embodiment, a moisture content of the graft copolymer may be controlled using a compression-type dehydrator or the like without drying of a coagulated product. The moisture content may be 5 to 15% or 5 to 10%. Within the range, a rubber-reinforced thermoplastic resin having superior thermal stability and surface gloss, and enhanced extrusion productivity due to omission of the drying process may be provided.

In a specific embodiment, the graft copolymer is first-coagulated with the coagulant described above after addition of an antioxidant and then is second-aged through temperature elevation. Subsequently, a wet powder having a moisture content of approximately 30% is obtained and the obtained powder is dehydrated using a compression-type dehydrator, etc. The dehydrated powder is prepared as a wet pellet type having a moisture content of approximately 10% and then, without a drying process, mixing with the matrix resin as a subsequent process may be carried out in the extruder.

A graft ratio of the graft copolymer may be ≥25% or 25 to 65%.

In an embodiment, the graft ratio is calculated according to Equation {the content of grafted monomer (g)/the content of rubber (g)}×100. In this regard, after adding 2 g of a powder obtained by solidifying, washing and drying the graft polymer latex to 300 ml and of acetone and stirring the same for 24 hours, a part ungrafted when an acetone solution separated using an ultracentrifuge is dropped into methanol is dried and the weight thereof is measured. When the graft ratio is less than 25%, gloss may be decreased.

In an embodiment, regarding the graft copolymer, the amount of solid product measured according to Equation 1 below may be 0.079 wt % or less, 0.001 to 0.07 wt % or 0.001 to 0.035 wt %.

$$\{\text{the content of generated solid (g)/the total content of rubber and monomer (g)}\}\times 100 \quad [\text{Equation 1}]$$

When the amount of the coagulated solid content is greater than the highest amount, latex stability is extremely poor and, due to a large amount of solid, the rubber-reinforced thermoplastic resin might not be suitably provided.

In an embodiment, the polymerization initiator may be one or more selected from an oil-soluble peroxide based polymerization initiator such as cumene hydroperoxide, diisopropylbenzene hydroperoxide, tert-butyl hydroperoxide, paramethane hydroperoxide or benzoyl peroxide, salt iron (II), iron (III), cobalt (II) or cerium (IV) as a metal, polysaccharide dihydroxyacetone such as dextrose, glucose or fructose as a reductant or an oxidation-reduction based polymerization initiator such as polyamines, and a water-soluble per sulfuric acid initiator such as per sulfuric acid potassium salt or sodium per sulfuric acid.

As the molecular weight controller, a conventionally used controller may be used. In an embodiment, the molecular weight controller may be mercaptans. In particular, n-octylmercaptan, n-dodecylmercaptan, t-dodecylmercaptan, etc may be used alone or a mixture of two or more thereof may be used.

When the small-particle-size rubber polymer and the graft copolymer are prepared, a reductant may be respectively added. In an embodiment, the reductant may be one or more selected from sodium formaldehyde sulfoxylate, sodiumethylenediamine tetraacetate, ferrous sulfate, dextrose, sodium pyrophosphate, and sodium sulfite, or a mixture thereof.

In an embodiment, the reductant may comprise 0.03 to 0.3 parts by weight of dextrose, 0.03 to 0.3 parts by weight of sodium pyrophosphate and 0.0015 to 0.01 parts by weight of ferrous sulfate, based on 100 parts by weight of the total conjugated diene monomer of the small-particle-size rubber polymer or based on 100 parts by weight of a total mixture of the rubber polymer and the monomer constituting the graft copolymer.

In an embodiment, the graft copolymer and the matrix resin may be mixed by mixing, melting and kneading 20 to 40 parts by weight or 25 to 30 parts by weight of the dehydrated graft copolymer; and 80 to 60 parts by weight or 75-70 parts by weight of one or more matrix resin selected from styrene-acrylonitrile copolymer, polyvinylchloride and polycarbonate.

In an embodiment, the styrene-acrylonitrile based copolymer may be an acrylonitrile-styrene copolymer comprising 10 to 35 wt % of acrylonitrile and 65 to 90 wt % of styrene; an acrylonitrile-styrene-alpha-methylstyrene tercopolymer comprising 25 to 39 wt % of acrylonitrile, 60 to 80 wt % of alpha-methylstyrene and 1 to 20 wt % of styrene; or a mixture thereof.

In a specific embodiment, the styrene-acrylonitrile based copolymer may be obtained by bulk-polymerizing or solution-polymerizing 10 to 35 wt %, 15 to 35 wt % or 20 to 25 wt % of the acrylonitrile based monomer and 65 to 90 wt %, 65 to 85 wt % or 75 to 80 wt % of the styrene based monomer. When the amount of the acrylonitrile based monomer is less than the ranges, gloss, thermal stability, etc. of a rubber-reinforced thermoplastic resin as a final product may be dramatically poor. The amount of the acrylonitrile based monomer is greater than the ranges, heat-welding characteristics may be poor.

The weight-average molecular weight of the styrene-acrylonitrile based copolymer may be 80,000 to 200,000 g/mol or 100,000 to 150,000 g/mol.

In the mixing, one or more selected from a light stabilizer, a lubricant, a UV absorber, a plasticizer, a coloring agent, a flame retardant, a fortifier, a compatibilizer, a foaming agent, wood flour, a filler, metal flour, an antimicrobial agent, an antifungal agent, silicone oil, and a coupling agent may be comprised as an additive.

As the kneading, conventional methods such as extrusion molding or injection molding may be used.

The content of emulsifier remaining in the rubber-reinforced thermoplastic resin prepared according to the method of preparing a rubber-reinforced thermoplastic resin may be 3590 ppm or less.

The content of the emulsifier remaining in the obtained rubber-reinforced thermoplastic resin is 3590 ppm or less, 3500 ppm or less or 100 to 3500 ppm. In this case, surface characteristics, thermal stability and gloss may be enhanced while maintaining impact resistance, chemical resistance, processability and heat-weldability.

In addition, the rubber-reinforced thermoplastic resin may have a graft ratio of 25% or more, 25 to 65%, or 35 to 55%, a final rubber content of 5 to 30% or 10 to 20%.

When the graft ratio is less than 25%, gloss and thermal stability of the rubber-reinforced thermoplastic resin as a final product may be decreased. When the graft ratio is greater than 65%, heat-welding characteristics may be deteriorated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

EXAMPLE

Example 1

Preparation of Small-Particle-Size Rubber Polymer (Hereinafter Referred to as Step a1)

75 parts by weight of 1,3-butadiene, 2 parts by weight of fatty acid soap, 0.0005 parts by weight of ferrous sulfide as a polymerization initiator, 0.008 parts by weight of dextrose, 0.006 parts by weight of sodium pyrophosphate, 0.2 parts by weight of tertiary dodecylmercaptan as a molecular weight controller, 0.2 parts by weight of sodium carbonate as an electrolyte and 130 parts by weight of ion deionized water were input batchwise to a polymerization reactor substituted with nitrogen, and emulsion polymerized at 55° C. for three hours.

Polymerization temperature was elevated up to 80 and reaction was carried out for six hours while continuously adding 25 parts by weight of 1,3-butadiene monomer and 0.1 parts by weight of tertiary dodecylmercaptan as a molecular weight controller to the polymerized product. In addition, 80 was maintained for four additional hours after adding 0.2 parts by weight of per sulfuric acid potassium thereto, and then reaction was terminated, thereby preparing a small-particle-size rubber polymer having a polymerization transition ratio of 98%, an average particle size of 1200 Å and a gel content of 94 wt % (Tg:−78±1° C.).

Properties of the rubber polymer were measured and results are summarized in Table 1 below.

Preparation of Large-Particle-Size Rubber Polymer (Hereinafter Referred to as Step b1)

100 parts by weight of the small-particle-size rubber latex of step a1 was input to a reactor. A stirring rate of the reactor was controlled to 50 rpm and temperature thereof was controlled to 30° C. Subsequently, 1.6 parts by weight of a 5% aqueous acidic solution were slowly added thereto over 30 minutes and stirred for 30 minutes. Subsequently, stabilization was performed by adding 1.5 parts by weight of a 10% aqueous KOH solution thereto and stirring was performed for 10 minutes, thereby preparing a large-particle-size rubber latex having an average particle size of 3200 Å. Properties of the rubber polymer were measured and results are summarized in Table 1 below.

Preparation of Graft Copolymer (Hereinafter Referred to as Step c1)

60 parts by weight of the large-particle-size rubber latex of step b1 was input to a reactor substituted with nitrogen. 10 parts by weight of acrylonitrile, 30 parts by weight of styrene, 10 parts by weight of ion deionized water, 0.12 parts by weight of t-butyl hydroperoxide, 0.2 parts by weight of an alkenyl C16-18 succinate potassium slat (ELOPLA AS200) as a reactive emulsifier (based on solid content, 28% aqueous solution), 0.2 parts by weight of a rosin-acid alkali salt and 0.3 parts by weight of tertiary dodecylmercaptan were mixed in a separate mixer and a prepared emulsion was continuously input thereto at 70° C. for three hours. Here, 0.054 parts by weight of dextrose, 0.004 parts by weight of sodium pyrophosphate and 0.002 parts by weight of ferrous sulfate were continuously added together.

After terminating addition of the monomer emulsion, 0.05 parts by weight of dextrose, 0.03 parts by weight of sodium pyrophosphate, 0.001 parts by weight of ferrous sulfate and 0.05 parts by weight of t-butyl hydroperoxide were input to the reactor batchwise and temperature was elevated up to 80° C. over one hour, followed by reaction termination.

An obtained polymer had a transition ratio of 98%, a graft ratio of 38% and a generated solid content of approximately 0.03%. Properties of the copolymer were measured and results are summarized in Table 1 below.

Preparation of Rubber-Reinforced Resin
(Hereinafter Referred to as Step d1)

0.5 parts by weight of an antioxidant emulsion (winstay-L/IR1076=0.8/0.2) having an average particle size of 0.9 μm was added to the graft rubber latex of step c1. Subsequently, first coagulation was carried out at 90° C. in the presence of 1.5 parts by weight of $MgSO_4$ and second aging was carried out at 97° C., thereby obtaining a powder-type graft polymer (wet powder type) having a moisture content of approximately 30%.

The powder-type graft copolymer having a moisture content of 30% was dehydrated such that a moisture content thereof became approximately 10% in a compression dehydrator, and provided as a wet pellet type. 1.5 parts by weight of styrene-acrylonitrile (SAN) bulk copolymer having a weight-average molecular weight of 130,000 g/mol and an acrylonitrile content of 24% and a lubricant, 0.1 parts by weight of a thermostabilizer, etc. were added thereto, and extrusion and injection molding were carried out, thereby preparing a specimen having a final rubber content of 15%. Subsequently, properties thereof were measured and results are summarized in Table 1 below.

Example 2

Preparation of Small-Particle-Size Rubber Polymer
(Hereinafter Referred to as Step a2)

50 parts by weight of 1,3-butadiene, 2 parts by weight of fatty acid soap, 0.0005 parts by weight of ferrous sulfide as a polymerization initiator, 0.008 parts by weight of dextrose, 0.006 parts by weight of sodium pyrophosphate, 0.2 parts by weight of tertiary dodecylmercaptan as a molecular weight controller, 0.2 parts by weight of sodium carbonate as an electrolyte and 130 parts by weight of ion deionized water were input batchwise to a polymerization reactor substituted with nitrogen, and emulsion-polymerized at 55 for one hour.

Temperature was elevated up to 80 and reaction was carried out for eight hours while continuously adding 50 parts by weight of 1,3-butadiene monomer and 0.1 parts by weight of tertiary dodecylmercaptan as a molecular weight controller to the reacted product. Subsequently, 80 was maintained for additional four hours after adding 0.2 parts by weight of per sulfuric acid potassium thereto, and then reaction was terminated, thereby preparing a small-particle-size rubber polymer having a polymerization transition ratio of 98.5%, an average particle size of 1150 Å and a gel content of 95 wt % (Tg:−78±1).

Properties of the rubber polymer were measured and results are summarized in Table 1 below.

Preparation of Large-Particle-Size Rubber Polymer
(Hereinafter Referred to as Step b2)

100 parts by weight of the small-particle-size rubber latex prepared in step a2 was input to a reactor. A stirring rate of the reactor was controlled to 50 rpm and temperature thereof was controlled to 30. Subsequently, 1.65 parts by weight of a 5% aqueous acetic acid solution was slowly added thereto over 30 minutes and stirred for 30 minutes. Subsequently, stabilization was performed by adding 1.55 parts by weight of a 10% aqueous KOH solution thereto and stirring was performed for 10 minutes, thereby preparing a large-particle-size rubber latex having an average particle size of 3250 Å.

Properties of the rubber polymer were measured and results are summarized in Table 1 below.

Preparation of Graft Copolymer (Hereinafter
Referred to as Step c2)

The same process as in step c1 of Example 1 was repeated, and a copolymer having a polymerization transition ratio of 97.5%, a graft ratio of 38.5% and a generated solid content of approximately 0.03% was obtained.

Properties of the copolymer were measured and results are summarized in Table 1 below.

Preparation of Rubber-Reinforced Resin
(Hereinafter Referred to as Step d2)

Extrusion and injection were carried out in the same manner as in step d1 of Example 1, and property evaluation was carried out. Results are summarized in Table 1 below.

Example 3

Preparation of Small-Particle-Size Rubber Polymer
(Hereinafter Referred to as Step a3)

20 parts by weight of 1,3-butadiene, 2 parts by weight of fatty acid soap, 0.0005 parts by weight of ferrous sulfide as a polymerization initiator, 0.008 parts by weight of dextrose, 0.006 parts by weight of sodium pyrophosphate, 0.2 parts by weight of tertiary dodecylmercaptan as a molecular weight controller, 0.2 parts by weight of sodium carbonate as an electrolyte and 130 parts by weight of ion deionized water were input batchwise to a polymerization reactor substituted with nitrogen, and polymerization temperature was elevated up to 80 and reaction was carried out for 10 hours while continuously adding 80 parts by weight of 1,3-butadiene monomer and 0.1 parts by weight of tertiary dodecylmercaptan as a molecular weight controller thereto when polymerization was initiated at 53° C. Subsequently, 0.2 parts by weight of per sulfuric acid potassium was added thereto and 80 was further maintained for three hours, followed by terminating the reaction. As a result, a small-particle-size rubber polymer having a transition ratio of 98.0%, an average particle size of 1100 Å and a gel content of 95.5 wt % was prepared (Tg:−78±1° C.).

Properties of the rubber polymer were measured and results are summarized in Table 1 below.

Preparation of Large-Particle-Size Rubber Polymer
(Hereinafter Referred to as Step b3)

100 parts by weight of the small-particle-size rubber latex prepared in step a3 was input to a reactor. A stirring rate of the reactor was controlled to 50 rpm and temperature thereof was controlled to 30. Subsequently, 1.65 parts by weight of a 5% aqueous acetic acid solution was slowly added thereto over 30 minutes and stirred for 30 minutes. Subsequently, stabilization was performed by adding 1.55 parts by weight of a 10% aqueous KOH solution thereto and stirring was performed for 10 minutes, thereby preparing a large-particle-size rubber latex having an average particle size of 3200 Å.

Properties of the rubber polymer were measured and results are summarized in Table 1 below.

Preparation of Graft Copolymer (Hereinafter Referred to as Step c3)

The same process as in step c1 of Example 1 was repeated, and a copolymer having a polymerization transition ratio of 98.0%, a graft ratio of 38.0% and a generated solid content of approximately 0.035%.

Properties of the copolymer were measured and results are summarized in Table 1 below.

Preparation of Rubber-Reinforced Resin (Hereinafter Referred to as Step d3)

Extrusion and injection were carried out in the same manner as in step d1 of Example 1, and property evaluation was carried out. Results are summarized in Table 1 below.

Comparative Example 1

Preparation of Small-Particle-Size Rubber Polymer (Hereinafter Referred to as Step a4)

75 parts by weight of 1,3-butadiene, 2 parts by weight of fatty acid soap, 0.0005 parts by weight of ferrous sulfide as a polymerization initiator, 0.008 parts by weight of dextrose, 0.006 parts by weight of sodium pyrophosphate, 0.2 parts by weight of tertiary dodecylmercaptan as a molecular weight controller, 0.2 parts by weight of sodium carbonate as an electrolyte and 130 parts by weight of ion deionized water were input batchwise to a polymerization reactor substituted with nitrogen, and emulsion-polymerized at 55 for five hours.

Reaction was carried out for six hours while elevating polymerization temperature up to 80 and after simultaneously adding 25 parts by weight of 1,3-butadiene monomer and 0.1 parts by weight of tertiary dodecylmercaptan as a molecular weight controller to the reacted product. Subsequently, 80 was maintained for four additional hours after adding 0.2 parts by weight of per sulfuric acid potassium thereto, and then reaction was terminated, thereby preparing a small-particle-size rubber polymer having a polymerization transition ratio of 97.0%, an average particle size of 1250 Å and a gel content of 92 wt % (Tg:−78±1).

Properties of the rubber polymer were measured and results are summarized in Table 1 below.

Preparation of Large-Particle-Size Rubber Polymer (Hereinafter Referred to as Step b4)

100 parts by weight of the small-particle-size rubber latex prepared in step a4 were input to a reactor. A stirring rate of the reactor was controlled to 50 rpm and temperature thereof was controlled to 30 Subsequently, 1.60 parts by weight of a 5% aqueous acetic acid solution were slowly added thereto over 30 minutes and stirred for 30 minutes. Subsequently, stabilization was performed by adding 1.50 parts by weight of a 10% aqueous KOH solution thereto and stirring was performed for 10 minutes, thereby preparing a large-particle-size rubber latex having an average particle size of 3200 Å. Properties of the rubber polymer were measured and results are summarized in Table 1 below.

Properties of the rubber polymer were measured and results are summarized in Table 1 below.

Preparation of Graft Copolymer (Hereinafter Referred to as Step c4)

The same process as in step C1 of Example 1 was carried out, and a copolymer having a polymerization transition ratio of 97.0%, a graft ratio of 35.0% and a generated solid content of approximately 0.3% was obtained.

Properties of the copolymer were measured and results are summarized in Table 1 below.

Preparation of Rubber-Reinforced Resin (Hereinafter Referred to as Step d4)

Extrusion/injection was carried by repeating the same process as in step d1 of Example 1, and then property evaluation was carried out. Results are summarized in Table 1 below.

Comparative Example 2

Preparation of Graft Copolymer (Hereinafter Referred to as Step c5)

Steps a4 and b4 of Comparative Example 1 were sequentially carried out, and 60 parts by weight of an obtained large-particle-size rubber polymer was input to a reactor substituted with nitrogen. To a separate mixer, a mixed emulsion comprising 10 parts by weight of acrylonitrile, 30 parts by weight of styrene, 10 parts by weight of ion deionized water, 0.12 parts by weight of t-butyl hydroperoxide, 1.2 parts by weight of rosin-acid alkali salt and 0.3 parts by weight of tertiary dodecylmercaptan was continuously input thereto at 70° C. for three hours. Here, 0.054 parts by weight of dextrose, 0.004 parts by weight of sodium pyrophosphate and 0.002 parts by weight of ferrous sulfate was continuously input thereto.

After adding the monomer emulsion, 0.05 parts by weight of dextrose, 0.03 parts by weight of sodium pyrophosphate, 0.001 parts by weight of ferrous sulfate, and 0.05 parts by weight of t-butyl hydroperoxide were added to the reactor batchwise. Subsequently, temperature was elevated up to 80° C. over one hour and reaction was terminated. As a result, a polymer having a polymerization transition ratio of 97.5%, a graft ratio of 34% and a generated solid content of approximately 0.08% was obtained.

Properties of the obtained graft copolymer were measured and are summarized in Table 1 below.

Preparation of Rubber-Reinforced Resin (Hereinafter Referred to as Step d5)

Extrusion and injection were carried out in the same manner as in step d1 of Example 1. Results are summarized in Table 1 below.

Test Method

<Property Measurement Manners of Rubber Polymer and Graft Copolymer>

Gel content and swelling index: a rubber latex was solidified using dilute acid or metal salt and then washed. The washed rubber latex was dried in a 60 vacuum oven for 24 hours. Subsequently, an obtained rubber mass was cut into small pieces with scissors, and 1 g of rubber piece was placed in 100 g of toluene, followed by storing in a room-temperature dark room for 48 hours. Subsequently, a sol and a gel were separated and then a gel content and a swelling index were respectively measured according to the equation below.

Gel content (%)=the weight of insoluble material (gel)/the weight of sample*100

Swelling index=the weight of swelled gel/the weight of gel

Particle size and particle size distribution: measured using Nicomp 370HPL (US, Nicomp Corporation) according to a dynamic laser light scattering method.

Latex stability of rubber polymer: 300 g of a final polymerization latex was filtered through a 100 mesh screen and then stood at 8000 rpm for 30 minutes using a Homomixer (T.K Robomics). Subsequently, the amount of solid filtered from the 100 mesh screen was recorded as % with respect to a theoretically obtained total solid content.

Polymerization-heat change (control) of small-particle-size rubber polymer: In order to examine ease of polymerization heat control, polymerization-heat change exhibited during polymerization with respect to polymerization temperature (initial polymerization: 53° C., temperature was elevated from 53° C. to 80° C., and later polymerization was set to an 80° C. maintaining mode) was represented by a ΔT(Max.) value. For reference, heating control is not easy with increasing ΔT difference in polymerization temperature.

<Property Measurement Manners of Rubber-Reinforced Thermoplastic Resin>

Izod impact strength—A specimen thickness was controlled to ¼" and Izod impact strength was measured according to ASTM 256.

Melt flow index (MI)—Measured according to ASTM D1238 under a condition of 220° C./10 kg.

Tensile strength—Measured according to ASTM D638.

Surface gloss—Measured according to ASTM D528 at an angle of 45°.

Retention gloss—A pellet obtained from an extruder was input to an injector and was retained at 270° C. for 15 minutes. Subsequently, a gloss specimen was obtained and 45° gloss of the obtained specimen was measured with an injected specimen at 200° C. without retention, and a deviation value thereof was measured. It was confirmed that retention gloss was superior with decreasing measurement value.

Retention discoloration (ΔE)—As in the retention gloss measurement method, L, a and b values of an obtained gloss specimen before and after retention were obtained using a Suga color computer, and a retention discoloration degree was obtained according to an equation below.

$$\Delta E = \sqrt{(L'-L)^2 + (a'-a)^2 + (b'-b)^2}$$

Content of remaining emulsifier (ppm): 0.2 g of a rubber-reinforced resin was exactly input to a 50 ml vial. 10 ml of acetone was added thereto and a sample was dissolved by sonicating for two hours. Subsequently, 30 ml of methanol was slowly added thereto, thereby precipitating a polymer. Sonication was carried out for one hour and an additive was extracted. A supernatant was taken and then filtered, followed by measuring a remaining emulsifier content using HPLC/DAD/MSD (Agilent 1100 system).

TABLE 1

| Classification | | Example 1 | Example 2 | Example 3 | Comparative Example 1 | Comparative Example 2 |
|---|---|---|---|---|---|---|
| Small-particle-sized rubber polymer-a | Polymerization transition ratio (%) | 98.0 | 98.5 | 98.0 | 97.0 | |
| | ΔT (Max.) | <2.5 | <1.5 | <1.0 | 5.0 | |
| | Weight average particle size (Å) | 1200 | 1150 | 1100 | 1250 | |
| | Polymerization time (hr) | 13 | 13 | 13 | 15 | |
| | Gel content (%) | 94.0 | 95.0 | 95.5 | 92.0 | |
| | Latex stability (%) | 0.02 | 0.03 | 0.05 | 0.1 | |
| Large-particle-sized rubber polymer-b | Weight average particle size (Å) | 3200 | 3250 | 3200 | 3200 | |
| Graft copolymer-c | Polymerization transition ratio (%) | 98.0 | 97.5 | 98.0 | 97.0 | 97.5 |
| | Graft ratio (%) | 38.0 | 38.5 | 38.0 | 35.0 | 34.0 |
| | Solid content (%) | 0.030 | 0.030 | 0.035 | 0.300 | 0.08 |

TABLE 1-continued

| Classification | | Example 1 | Example 2 | Example 3 | Comparative Example 1 | Comparative Example 2 |
|---|---|---|---|---|---|---|
| Rubber-reinforced thermoplastic resin-d | Impact strength (1/4") (kg · cm/cm) | 23.5 | 23.0 | 23.2 | 21.0 | 20.5 |
| | fluidity (g/10 min) | 21.0 | 21.5 | 21.3 | 20.0 | 20.5 |
| | Tensile strength (kg/cm$^2$) | 510 | 515 | 512 | 520 | 522 |
| | Whiteness | 58.0 | 58.2 | 58.1 | 56.0 | 55.0 |
| | Glossiness (45°) | 109.5 | 109.4 | 109.4 | 108.0 | 107.0 |
| | Retention gloss (%) | 2.1 | 2.3 | 2.2 | 2.8 | 3.0 |
| | Retention discoloration (ΔE) | 3.1 | 3.2 | 3.0 | 4.0 | 4.5 |
| | Remaining emulsifier (ppm) | 3500 | 3400 | 3450 | 3600 | 4200 |

As shown in Table 1, when the specific content of the butadiene monomer is continuously injected upon preparing the small-particle-size rubber polymer according to Example 1 to 3, superior mechanical properties such as impact strength, fluidity and tensile strength, enhancement of thermostability such as whiteness, gloss, retention gloss, retention discoloration, gloss, and surface visibility, and reduction of a remaining emulsifier content are exhibited, when compared with Comparative Example 1 in which simultaneous injection is carried out without application of continuous injection, or Comparative Example 2 in which continuous injection is carried out but the reactive emulsifier is not applied upon preparing of the graft copolymer.

For reference, the polymerization-heat control values of Examples 1 to 3 is superior than those of Comparative Examples 1 to 2. Accordingly, it can be investigated that the present invention may provide a polymerization-heat-control-type small-particle-size rubber polymer. For reference, polymerization stability is decreased with increasing ΔT in polymerization temperature. In addition, when a large amount of refrigerant is added for heat removal, activity of peroxide is decreased, whereby polymerization time is extended or a polymerization transition ratio is decreased.

As a result, when a small-particle-size rubber polymer according to the present invention is prepared, a rubber polymer having superior polymerization productivity through effective polymerization heat control may be obtained. In addition, it can be confirmed that, by using the rubber polymer, a rubber-reinforced thermoplastic resin having superior mechanical properties, thermostability, gloss and surface visibility may be provided.

What is claimed is:

1. A method of preparing a rubber-reinforced thermoplastic resin, the method comprising:
    preparing a small particle size rubber polymer using a polymerization process in which temperature deviation is 4° C. or less, the small particle size rubber polymerization process including polymerizing a conjugated diene monomer;
    preparing a rubber polymer having a large particle size using the small particle size rubber polymer;
    preparing an acrylonitrile-styrene-butadiene-based graft copolymer from the rubber polymer having the large particle size;
    dehydrating the acrylonitrile-styrene-butadiene-based graft copolymer to a moisture content of 5 to 15%; and
    mixing the dehydrated graft copolymer and a matrix resin,
    wherein the preparation process of the small-particle-size rubber polymer comprises (a) inputting batchwise a first composition containing 5 to 80 parts by weight of the conjugated diene monomer and initiating the reaction at 50 to 70° C.; and (b) at a time point of 0 to 8 hours from the reaction initiation point, performing emulsion polymerization at 70 to 80° C. while continuously inputting a second composition containing 95 to 20 parts by weight of a conjugated diene monomer for 4 to 10 hours, and after commencement of the continuous addition, controlling temperature deviation to be 4° C. or less during step (b).

2. The method according to claim 1, wherein the small-particle-size rubber polymer is prepared by emulsion-polymerizing at polymerization temperature of 50 to 80° C. for 5 to 13 hours.

3. The method according to claim 1, wherein the first composition comprises 1 to 4 parts by weight of a reactive emulsifier, 0.1 to 3 parts by weight of a polymerization initiator, 0.1 to 1 parts by weight of a molecular weight controller, 0.1 to 3 parts by weight of an electrolyte and 100 to 150 parts by weight of ion deionized water, based on 100 parts by weight of the conjugated diene monomer.

4. The method according to claim 1, wherein the second composition comprises 0.01 to 1 parts by weight of a molecular weight controller based on 100 parts by weight of the total conjugated diene monomer.

5. The method according to claim 1, wherein the small-particle-size rubber polymer has an average particle size of 500 to 2000 Å, a gel content of 90 to 99 wt % and glass transition temperature (Tg) of 0° C. or less.

6. The method according to claim 1, wherein, in the preparing into the large particle size, a rubber polymer having an average particle size of 2500 to 4000 Å is obtained by welding the small-particle-size rubber polymer with 0.1 to 5 parts by weight of one or more acidic ingredients selected from acetic acid and phosphoric acid based on 100 parts by weight of the small-particle-size rubber polymer.

7. The method according to claim 1, wherein the acrylonitrile-styrene-butadiene-based graft copolymer is prepared by polymerizing at 45 to 80° C. for three to six hours while continuously inputting to 0.001 to 0.5 parts by weight of a reactive emulsifier, or a mixed emulsifier comprising 0.001 to 0.3 parts by weight of a reactive emulsifier and 0.1 to 0.7 parts by weight of a non-reactive emulsifier; 0.1 to 0.5 parts by weight of a molecular weight controller; and 0.1 to 0.5 parts by weight of a polymerization initiator to 100 parts by weight of a mixture that comprises 50 to 70 wt % of the rubber polymer prepared into a large particle size; and 50 to 30 wt % of a mixture comprising a styrene based monomer and an acrylonitrile based monomer, in an emulsion state, wherein the parts are based on the weight of styrene based monomer and acrylonitrile based monomer being 100 parts.

8. The method according to claim 1, wherein the acrylonitrile-styrene-butadiene-based graft copolymer is prepared in a solution with a coagulated solid content of the graft copolymer of 0.001 to 0.07 wt % of a total content of the rubber polymer and monomers in the solution.

9. The method according to claim 1, wherein the dehydrating is carried out after coagulating the graft copolymer with one coagulant or more selected from $MgSO_4$, $CaCl_2$, $Al_2(SO_4)_3$, sulfuric acid, phosphoric acid and hydrochloric acid.

10. The method according to claim 3, wherein the reactive emulsifier is one or more selected from sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid di-potassium salt and sodium methallyl sulfonate.

11. The method according to claim 3, wherein the first composition further comprises a non-reactive emulsifier including one or more selected from alkylaryl sulfonate, methyl alkyl sulfate, sulfonated alkyl ester, fatty-acid soap and rosin-acid alkali salt.

12. The method according to claim 1, wherein the graft copolymer and the matrix resin are mixed by mixing, melting and kneading 20 to 40 parts by weight of the dehydrated graft copolymer with 80 to 60 parts by weight of one or more matrix resin selected from styrene-acrylonitrile based copolymer, polyvinylchloride and polycarbonate, based on 100 parts per weight of a total mixture.

13. The method according to claim 12, wherein the styrene-acrylonitrile based copolymer is an acrylonitrile-styrene copolymer comprising 10 to 35 wt % of acrylonitrile and 65 to 90 wt % of styrene; an acrylonitrile-styrene-alpha-methylstyrene tercopolymer comprising 25 to 39 wt % of acrylonitrile, 60 to 80 wt % of alpha-methylstyrene and 1 to 20 wt % of styrene; or a mixture thereof.

14. The method according to claim 7, wherein the reactive emulsifier is one or more selected from sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid di-potassium salt and sodium methallyl sulfonate.

15. The method according to claim 7, wherein the non-reactive emulsifier is one or more selected from alkylaryl sulfonate, methyl alkyl sulfate, sulfonated alkyl ester, fatty-acid soap and rosin-acid alkali salt.

* * * * *